United States Patent [19]

Kato et al.

[11] Patent Number: 4,668,719

[45] Date of Patent: May 26, 1987

[54] INSULATING PROTECTIVE MATERIAL

[75] Inventors: Hideki Kato, Mie; Noriyuki Yamamoto, Aichi, both of Japan; Takahisa Ogasawara, deceased, late of Okayama, Japan, by Kuniko Ogasawara, legal successor; Masami Asai, deceased, late of Aichi, Japan, by Yasuko Asai, legal successor

[73] Assignee: Toagosei Chemical Industry Co., Ltd., Tokyo, Japan

[21] Appl. No.: 779,242

[22] Filed: Sep. 23, 1985

[51] Int. Cl.[4] .............................................. C08K 5/00
[52] U.S. Cl. ................... 523/458; 65/30.13; 501/32; 523/402; 523/442; 523/444; 523/457; 523/460; 523/459; 524/406; 524/408; 524/410; 524/413; 524/401; 524/431; 524/434; 524/435
[58] Field of Search .................. 501/32; 65/30.13; 523/402, 442, 444, 457, 458, 459, 460; 524/406, 408, 410, 413, 401, 431, 434, 435

[56] References Cited

U.S. PATENT DOCUMENTS 3,929,494 12/1975 Veres ..................................... 501/32
4,486,553 12/1984 Wesch ................................. 523/402

OTHER PUBLICATIONS

Talanta, 1972, vol. 19, pp. 219 to 262, Pergamon Press, Northern Ireland.

Primary Examiner—Melvyn I. Marquis
Attorney, Agent, or Firm—Wyatt, Gerber, Shoup, Scobey and Badie

[57] ABSTRACT

This invention provides an insulating protective material effective for protection of electronic and electric devices such as electronics elements. This insulating protective material contains at least one hydrous oxide of a metal which has ion exchange properties together with a fusion bonding component such as low-melting glass, epoxy resin, phenolic resin, silicone resin, etc. and a filler such as fused silica, $\beta$-eucryptite, glass fiber, glass beads, etc.

Said specific hydrous oxide can be used together with a sulfur-containing organic high molecular weight compound.

The hydrous oxides used in protective materials as a sealing material for electronic and electric devices can capture an ionic impurity eluted from the components of the protective material and fix it therein thereby to provide stable electronic materials excellent in performance.

13 Claims, No Drawings

INSULATING PROTECTIVE MATERIAL

BACKGROUND OF THE INVENTION

This invention relates to an insulating protective material effective for protecting electronic and electrical components such as electronic elements and the like.

More particularly it relates to protective material used for protecting elements, contacts, etc. of IC packages and electronic devices including the IC packages used as electronic materials or electronic and electrical components such as electronic elements, e.g., indicator tubes. According to this invention there is provided an insulating protective material which can maintain stable and excellent performances with no elution of ionic substances (referred to as "ionic impurity" hereinafter) present therein by capturing and fixing the ionic impurity by adding a specific hydrous oxide.

Insulating protective materials used for protection of elements or contacts of electronic elements utilizing various functions such as semiconducting functions, dielectric functions, magnetic functions, insulating functions, coloring and decoloring function (e.g., diode, transistor, condenser, liquid crystal, thermistor, IC, LSI, etc) and electronic devices having these elements or indicator tubes are called sealers, casting materials, potting materials, interlaminer maintaining materials, junction coating materials, passivation materials, dipping materials, sealing materials, roller coating materials, drip coating materials and the like depending on their application purposes, devices, positions, means, etc.

As components of these insulating protective materials (referred to as "protective material" hereinafter) there are known such fusion bonding materials as ceramic materials such as low-melting glasses and high-molecular weight materials such as epoxy resin, epoxysilicone resin, silicone resin, phenolic resin. In general, high-molecular weight materials are often used because of their good moldability, their mass-producibility, and because they are inexpensive.

These are seldom used alone and are ordinarily used together with fillers. Typically useful inorganic fillers include lead titanate, fused silica, $\beta$-eucryptite, titanium oxide, glass fibers, glass beads and the like.

Properties required for these protective materials are low-temperature and short-time fusibility and hardenability, low expansion or negative expansion against temperature rise, formation of strong sealing power and high insulation property. The insulation property is especially important.

It has been said that various inhibition factors such as migration of ionic impurity in protective materials, moisture absorption of protective materials, charge density at the solid surface of protective materials, etc. are related in a complex manner to the insulation property resulting in bad effects thereon. Furthermore, halogen ions are considered to cause corrosion of electronic elements such as IC elements or lead wires. Many countermeasures for removing these effects have been proposed. Generally, the above effects on protective materials as final products are prevented by selection of raw materials and prevention of contamination in purification and production processes.

Particularly, effects of alkali metal ions ($Li^+$, $Na^+K^+$, etc) and halogen ions ($F^-$, $Cl^-$, $Br^-$, etc) which are ionic impurities cannot be disregarded. Presence of these ions even in an amount of a few ppm is considered to cause reduction of insulation. These ionic impurities are desirably completely eliminated in the process of production of protective materials, but practically it is very severe burden from processing and economic viewpoints to eliminate even the slight amount of the ionic impurities.

The alkali metal ions and halogen ions come from the impurities in inorganic fillers which are a constitutional component of the protective materials such as fused silica, titanium oxide, $\beta$-eucryptite, glass fibers, glass beads, etc., but some come from raw materials for organic high molecular weight materials which are another component of the protective materials. For example, an epoxy resin is most commonly used as a component of protective materials. It is synthesized from epichlororhydrin

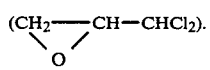

According to this synthesis reaction dehydrochlorination is carried out with a catalyst such as an alkali hydroxide and sodium chloride is produced as a reaction product. The synthesis is performed using excess epichlorohydrin and so there remains unreacted epichlorohydrin in the epoxy resin provided as a component of protective materials. In this case the halogen present as a functional group does not have effect on insulation in chemically bonded state, but the remaining unreacted epichlorohydrin often decomposes under some condition and behaves as an ionic impurity.

Furthermore, sulfur-containing organic high molecular weight compounds such as polyether sulfone

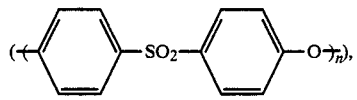

polyphenylene sulfide

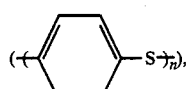

polysulfone sulfide

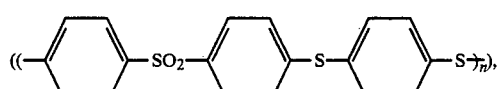

etc. are expected to displace epoxy resins. However, as with epoxy resins, production of these compounds requires organic halogen compounds, e.g., 1,4-dichlorobenzene

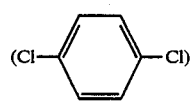

and dichlorodiphenyl sulfone

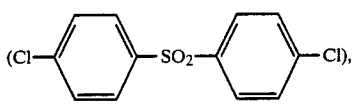

as starting materials and the synthesis reactions all comprise sodium chloride elimination reaction. In these cases, the produced polyether sulfone, polyphenylene sulfide and polysulfone sulfide, usually contain unreacted halogen compounds, which are decomposed by heat, moisture and the like to produce halogens. For this reason these compounds, though they are effective as a components of protective materials, have not yet been practically used.

On the other hand, some of the fillers which constitute the protective material contain an alkali metal ion as a principal component and such component is known to play a part of the performance of the protective material.

For example, $\beta$-eucryptite ($LiO_2 \cdot Al_2O_3 \cdot nSiO_2$) has a negative expansion property against increasing temperature. Owing to this property attempts have been made to utilize this substance as a filler for protective materials. However, $\beta$-eucryptite is also a conductor of lithium ion and lithium ions move in an electric field. From the viewpoint of insulation property of protective materials $\beta$-eucryptite must be regarded as an ionic impurity which cause undesirable results.

Since ions present in protective materials move with electrical charge to give electrical conductivity, it is necessary for improving insulation to provide conditions to prevent the migration of ions.

SUMMARY OF THE INVENTION

This invention provides an excellent insulating protective material in which ions remaining in the protective material as impurities or ions in the principal component such as lithium ion in $\beta$eucryptite are all captured and fixed as ionic impurities without allowing migration.

The above object has been achieved by an insulating protective material which contains at least one hydrous oxide of a metal which has ion exchange properties.

It is disclosed in Japanese Patent Unexamined Publications (Kokai) No. 176237/83 and No. 174435/83 to add to a sealing material a substance having ion exchange property, e.g., ion exchange resin, zeolite, zirconium phosphate, etc. However, it is not known that a hydrous oxide of a metal which has ion exchange properties captures and fixes simultaneously and efficiently alkali metal ions such as sodium, potassium, lithium, etc. and halogen ions such as chlorine, etc. This remarkable effect has been found by the inventors.

DETAILED DESCRIPTION OF THE INVENTION

The hydrous oxides of metals which have ion exchange properties used in the insulating protective materials according to this invention include those which have cation exchange properties, especially for alkali metal ions, those which have anion exchange properties, especially for halogen ions and those which have both anion and cation exchange properties. Typical examples of those which have alkali metal ion exchange properties are polyvalent metal hydrous oxides such as antimonic acid, tantalic acid, niobic acid, etc. and salts thereof. These hydrous oxides all have $-O^-H^+$ bond which exhibits ion exchange property and in which $H^+$ is exchangeable with an alkali metal ion.

As typical examples of hydrous oxides having halogen ion exchange properties, mention may be made of those which have -OH bond as above mentioned such as hydrotalcite ($Mg_6Al_2(OH)_{16}CO_3 \cdot 4H_2O$), hydrous iron oxide, hydrous zirconium oxide, hydrous titanium oxide, hydrous tin oxide, hydrous manganese oxide, hydrous bismuth oxide, etc. These are preferably used in combination with said oxides having alkali metal ion exchange properties. Typical examples of those which have both the anion and cation exchange properties are composite salts such as manganese antimonate, bismuth antimonate, tin antimonate, titanium antimonate, zirconium antimonate, etc. These may be used properly depending on uses.

Of these hydrous oxides of various metals, especially useful are antimonic acid and salts thereof, hydrous bismuth oxide, hydrous manganese oxide, hydrous tin oxide, hydrous titanium oxide, hydrous zirconium oxide, etc.

The method of using these hydrous oxides depends on kind and amount of ions to be captured in protective materials and balance of other properties as protective materials. The amount of the hydrous oxides added is preferably 40% by weight or less, especially 1.5-25% by weight per total weight of the protective material. When the amount is too small, the ionic impurities cannot be captured and fixed and too large amount adversely influences the inherent sealing effect of the protective material and moreover is economically unsound.

The ionic form of the hydrous oxides having cation exchange properties is preferably the H form, but it may be a salt form which has other metal ion partially replaced.

This is because inorganic fillers are considered to contain alkaline ionic impurities and unnecessary metal ion impurities should not be increased. When the hydrous oxide having cation exchange properties is in monobasic acid form $MO^-H^+$, this oxide reacts with an alkaline ionic impurity $A^+OH^-$ as follows:

Water is liberated in this reaction. This water is removed from the system by heat treatment when IC packages, electronics elements, etc. are insulation protected with the protective material, resulting in improvement of insulation properties.

The compounds having anion exchange properties have an ion form which is preferably the OH form, but this may be partially replaced with other anion.

When the hydrous oxide having anion exchange properties has a monoacidic base form of $N^+OH^-$, this reacts with anionic impurity $H^+X^-$ (example of halogenous acids) as shown below to liberate water.

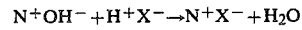

Similarly, joint use of said cation exchange compound $MO^-H^+$ and said anion exchange compound $N^+OH^-$ for neutral form impurity $A^+X^-$ results in water as follows:

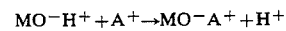

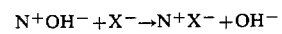

$$H^+ + OH^- \rightarrow H_2O$$

The product water is removed from the system by heat treatment and so does not damage the insulation properties.

In this invention there may be used hydrous oxides of metals which have cation exchange properties, those having anion exchange properties and those having both the anion and cation exchange properties. However, considering the efficiency of capturing and fixing halogen ions and alkali ions, it is preferred to use those having both the anion and cation exchange properties or to use mixtures of those having cation exchange properties with those having anion exchange properties.

The hydrous oxides of metals which have only cation exchange properties or only anion exchange properties are not completely satisfactory for capturing and fixing impurity ions. Even if pH of the protective material is changed in an attempt to improve the efficiency, halogen ions may be captured, but alkali ions may not be captured or conversely, alkali ions may be captured, but halogen ions may not be captured. These problems can be removed by joint use of both the cation exchange oxides and anion exchange oxides.

According to this invention the hydrous oxide may be used as a uniform mixture in a protective composition or used so that it covers the surface of an inorganic filler.

As aforementioned, known materials such as low-melting glass, epoxy resin, phenolic resin and silicone resin for fusion bonding and fused silica, β-eucryptite glass fibers and glass beads are selected as fillers and used in combination with the others components of the protective materials of this invention. It is one of the superior effects of this invention that is possible to use as additional components in the insulating protective materials of this invention, sulfur-containing organic high molecular weight compounds such as polyether sulfone, polyphenylene sulfide, polysulfone sulfide, etc. which are produced using organic compounds having halogen atom. It has heretofor been difficult to use these materials in this field.

The following non-limiting examples and comparative examples illustrate this invention.

EXAMPLE 1 AND COMPARATIVE EXAMPLE 1

Antimony pentachloride and tin tetrachloride in a molar ratio of 3:1 were dissolved in 6N aqueous HCl solution. The resultant solution was diluted with water to an acid concentration of 2N to hydrolyze the antimony pentachloride and antimony tetrachloride. The mixture was then digested at 60° C. for 6 hours. Then, the product was filtered out with a filter of 0.4μ to obtain a mixture containing antimonic acid and stannic acid (referred to as "tin antimonate (molar ratio of Sb:Sn is 3:1)" hereinafter). The resultant tin antimonate (3:1) was washed with water and then calcined at 200° C. to remove water and hydrochloric acid.

0.5 g of thus prepared tin antimonate (3:1), 4.0 g of β-eucryptite, 2.1 g of O-cresol novolak type epoxy resin and 0.1 g of an imidazole curing agent were well mixed and the mixture was hardened and molded into a plate of 55 mm long×55 mm wide×2 mm thick in a press under the conditions of 175° C., 100 kg/cm² and 30 minutes.

Then, square plates of 1 cm×1 cm were cut out from said hardened plate by a knife and employed as sample plates. A number of these samples weighing totally about 2 g were placed in a pyrex vessel, into which 20 ml of water was poured. This pyrex vessel was placed in an autoclave and heated at 100°–120° C. and a gauge pressure of 1 kg/cm² to elute alkali metal ions. After cooling, the vessel was taken out and sodium ion and chlorine ion eluted into water were analyzed (Example 1).

Similarly, a blank test was conducted in the absence of tin antimonate (3:1) (Comparative Example 1).

The results are shown in Table 1. As is recognized therefrom elution of the ions in the presence of tin antimonate (3:1) was less than 1/10 of elution in the absence of tin antimonate (3:1) and the ions were fixed in the hardened plate in the former case.

TABLE 1

|  | Tin antimonate (3:1) | Eluted Na | Eluted Cl |
| --- | --- | --- | --- |
| Example 1 | Present | 9.0 ppm | 3 ppm |
| Comparative Example 1 | Absent (Blank) | 122 ppm | 60 ppm |

EXAMPLES 2 AND 3

In accordance with the manner of preparation of tin antimonate (3:1) in Example 1, antimony pentachloride and bismuth nitrate in the molar ratio of 1:1 and antimony pentachloride and metallic manganese in the molar ratio of 1:1 were hydrolyzed under the acid concentration of Example 1 to obtain a mixed acid of antimonic acid and bismuthic acid (referred to as "bismuth antimonate (molar ratio of Sb:Bi is 1:1)" hereinafter) and a mixture containing antimonic acid and manganic acid (referred to as "manganese antimonate (molar ratio of Sb:Mn is 1:1)" hereinafter). These were washed with water and calcined as in Example 1.

In the same manner as in Example 1 each of 0.5 g of thus obtained hydrous oxides was mixed with the β-eucryptite, the epoxy resin and the curing agent to obtain a hardened plate, respectively. These were subjected to the same test as in Example 1 to examine elution of ions (Examples 2 and 3). The results are shown in Table 2. Elution of ions was markedly prevented as compared with the blank test of Comparative Example 1 and the ions were fixed in the hardened plates.

TABLE 2

|  | Hydrous oxide | Eluted Na | Eluted Cl |
| --- | --- | --- | --- |
| Example 2 | Bismuth antimonate (1:1) | 5 ppm | 1 ppm |
| Example 3 | Manganese antimonate (1:1) | <1 ppm | 4 ppm |

COMPARATIVE EXAMPLE 2

Zirconium oxychloride and concentrated phosphoric acid were allowed to react with heating in the presence of excess phosphoric acid followed by filtration and washing with water to produce zirconium phospate. This zirconium phosphate was half-neutralized with NaOH to obtain a neutral form of zirconium phosphate. This compound was thoroughly washed with water and then calcined at 200° C. The resultant zirconium phosphate of neutral form was indicated by $ZrNaH(PO_4)_2$.

In the same manner as in Example 1, a hardened plate was prepared using 0.5 g of $ZrNaH(PO_4)_2$ and subjected to the hot water elution test. Analysis was effected for sodium, potassium and chlorine ions.

The results are shown in Table 3 in comparison with the results on the blank test piece of Comparative Example 1. As is clear therefrom the zirconium phosphate had some effects on sodium and potassium ions, but utterly no effects on chlorine ion.

TABLE 3

|  | Additives | Eluted Na | Eluted K | Eluted Cl |
|---|---|---|---|---|
| Comparative Example 2 | ZrNaH(PO$_4$)$_2$ | 23 ppm | <1 ppm | 58 ppm |
| Comparative Example 1 | — (Blank) | 122 ppm | 7 ppm | 60 ppm |

COMPARATIVE EXAMPLE 3

In the same manner as preparation of zirconium phosphate in Comparative Example 2, cerium phosphate, tin phosphate and titanium phosphate all in neutral form were prepared using cerium sulfate, tin tetrachloride and titanium tetrachloride. Using these compounds as hydrous oxides, hardened plates with the same constitution as those of Example 1 were made and subjected to the test for elution of alkali metal ions to obtain nearly the same results as in Comparative Example 2.

EXAMPLE 4

Potassium pyroantimonate and tin tetrachloride were mixed so that molar ratio of antimony and tin was 1:2 and sufficient hydrochloric acid was added so that acid the concentration of the aqueous solution was 2N. In accordance with the procedure of Example 1 there was obtained a composite acid tin antimonate (1:1.8) containing antimonic acid and stannic acid in a molar ratio of 1:1.8.

0.5 g of thus obtained tin antimonate (1:1.8) was homogeneously mixed with 4.0 g of β-eucryptite, 2.1 g of a novolak type epoxy resin and 0.5 g of an imidazole curing agent and the mixture was hardened under heat by the method of Example 1. The resulting plates were subjected to the hot water elution test. The results obtained on sodium, lithium and chlorine ions are shown in Table 4 together with the results of the blank test (Comparative Example 1). It is recognized that they have effect on Li$^+$ ion, too.

TABLE 4

|  | Hydrous oxide | Eluted Na | Eluted Li | Eluted Cl |
|---|---|---|---|---|
| Example 4 | Tin antimonate (1:1.8) | 7.1 ppm | 5 ppm | 6 ppm |
| Comparative Example 1 | — (Blank) | 122 ppm | 80 ppm | 60 ppm |

EXAMPLES 5–6 AND COMPARATIVE EXAMPLE 4

Titanium antimonate (1:1) and zirconium antimonate (1:1) were prepared from antimony pentachloride and titanium tetrachloride in a molar ratio of 1:1 and from antimony pentachloride and zirconium oxychloride in a molar ratio of 1:1, respectively, in the same manner as in Example 1.

0.5 g of each thus obtained hydrous oxides, 4.5 g of fused silica, 2.1 g of O-cresol novolak type epoxy resin and 0.1 g of imidazole type curing agent were homogeneously mixed and the mixtures were hardened in the manner of Example 1 (Examples 5–6). These products were subjected to the same hot water elution test as of Example 1 and the results are shown in Table 5 in comparison with the results of the blank test (Comparative Example 4).

TABLE 5

|  | Hydrous Oxide | Eluted Na | Eluted Cl |
|---|---|---|---|
| Example 5 | Titanium antimonate (1:1) | <1 ppm | <1 ppm |
| Example 6 | Zirconium antimonate (1:1) | <1 ppm | 2 ppm |
| Comparative Example 4 | — (Blank) | 10 ppm | 18 ppm |

EXAMPLES 7–8 AND COMPARATIVE EXAMPLE 5

Antimony trioxide and bismuth trioxide in an atomic ratio of antimony and bismuth of 3:1 were dissolved in aqua regia of 4:1 (HCl:HNO$_3$) followed by hydrolysis so that the acid concentration was 2N–3N. The mixture was digested under heat at 75° C. for 8 hours. Thereafter, the product was filtered with a precision filter of 0.4μ and thoroughly washed with water to obtain acid mixture containing antimonic acid and bismuthic acid (which was called "bismuth antimonate (molar ratio of Sb:Bi is 3:1)" hereinafter). The bismuth antimonate (3:1) was calcined at 230° C. to remove the remaining water and acid.

0.4 g of thus obtained bismuth antimonate (3:1) was well mixed with 4.0 g of β-eucryptite, 1.9 g of O-cresol novolak type resin and 0.6 g of an imidazole type curing agent in a ball mill. The mixture was hardened and molded in a mold press into a 60 mm × 60 mm × 2 mm plate under the conditions of 175° C., 100 kg/cm$^2$ and 45 minutes.

In the manner of Example 1 sodium, potassium and chlorine ions eluted from the hardened plate into water were analyzed (Example 7).

Similarly, a composite acid of antimonic acid and manganic acid in an atomic ratio of metals of 3:2 (which was called "manganese antimonate (molar ratio of Sn:Mn is 3:2)" hereinafter) was prepared and subjected to the similar test (Example 8). Separately, a blank test was conducted in the absence of the hydrous oxide (Comparative Example 5).

The results of Examples 7–8 and Comparative Example 5 are shown in Table 6. It is clear therefrom that in Examples 7–8 sodium, potassium and chlorine ions were captured and fixed in the hardened plate and prevented from election therefrom as compared with in the blank test of Comparative Example 5.

TABLE 6

|  | Hydrous oxide | Eluted Na | Eluted K | Eluted Cl |
|---|---|---|---|---|
| Example 7 | Bismuth antimonate (3:1) | 3.5 ppm | <1 ppm | <1 ppm |
| Example 8 | Manganese antimonate (3:2) | <1 ppm | <1 ppm | 4 ppm |
| Comparative Example 5 | — (Blank) | 130 ppm | 9 ppm | 65 ppm |

EXAMPLE 9 AND COMPARATIVE EXAMPLE 6

Potassium pyroantimonate and tin tetrachloride were mixed so that the molar ratio of antimony and tin became 1:2.5 and from the mixture was prepared a composite acid of antimonic acid and stannic acid in a molar ratio of 1:2.3, namely, tin antimonate (1:2.3).

In accordance with the manner of Example 4 except that the antimonic acid and stannic acid molar ratio was 1:2.3, a hot water elution test was effected using said tin antimonate (1:2.3). The results are shown in Table 7 together with the results of the blank test for sodium and lithium ions (Comparative Example 6), from which it is recognized that the hydrous oxide used displayed effects also for $Li^+$ ion.

TABLE 7

|  | Hydrous oxide | Eluted Na | Eluted Li |
|---|---|---|---|
| Example 9 | Tin antimonate (1:2.3) | 11 ppm | 3 ppm |
| Comparative Example 6 | — (Blank) | 130 ppm | 65 ppm |

EXAMPLES 10–11 AND COMPARATIVE EXAMPLE 7

In the same manner as in Example 7 titanium antimonate (3:2) and zirconium antimonate (3:2) were prepared from antimony pentachloride and titanium tetrachloride in a molar ratio of 3:2 and antimony pentachloride and zirconium oxychloride in a molar ratio of 3:2, respectively.

In accordance with the procedure of Example 5 utilizing the same amounts of fused silica, o-cresol novolak type epoxy resins and imidazole type curing agent, the hot water elution test was carried out for said hydrous oxides. The results are shown in Table 8 in comparison with the results of blank test (Comparative Example 6).

TABLE 8

|  | Hydrous oxide | Eluted Na | Eluted Cl |
|---|---|---|---|
| Example 10 | Titanium antimonate (3:2) | <1 ppm | <1 ppm |
| Example 11 | Zirconium antimonate (3:2) | <1 ppm | <1 ppm |
| Comparative Example 7 | — (Blank) | 10 ppm | 18 ppm |

EXAMPLE 12 AND COMPARATIVE EXAMPLE 8

0.6 g of tin antimonate (2:1) obtained in accordance with the procedure of Example 7, 5.4 g of fused silica and 4.0 g of polyphenylene sulfide were well mixed by a powder mixer and placed in a mold and calcined at 350° C. to mold into a plate of 2 mm thick.

In the same manner as in Example 7 sodium ion eluted from this molded product into water was analyzed (Example 12). Separately, a blank test was effected in the absence of the tin antimonate (2:1) (Comparative Example 8). As shown in Table 9, elution of sodium ion in the presence of tin antimonate (2:1) was less than 1/10 of that of sodium ion in the absence of tin antimonate (2:1). Thus, it is clear that sodium ion was captured and fixed in the hardened plate.

TABLE 9

|  | Tin antimonate (2:1) | Eluted Na |
|---|---|---|
| Example 12 | Present | 11 ppm |
| Comparative Example 8 | Absent (Blank) | 145 ppm |

EXAMPLES 13–14 AND COMPARATIVE EXAMPLE 9

0.6 g of bismuth antimonate (3:1) obtained according to the method of Example 7, 5.4 g of fused silica and 5.0 g of polyether sulfone were well mixed by a powder mixer and calcined and molded at 350° C. in a mold to obtain a molded plate similar to that of Example 12.

In the same manner as in Example 7 the plate was subjected to the hot water elution test to examine elution of sodium, potassium and chlorine ions into hot water (Example 13).

The same test utilizing the same amounts of fused silica and polyether sulfone was conducted for manganese antimonate (3:2) obtained by the method of Example 7 (Example 14).

Similarly, a blank test was carried out in the absence of bismuth antimonate (3:1) and manganese antimonate (3:2) in Examples 13 and 14 (Comparative Example 9).

The results of Example 13, Example 14 and Comparative Example 9 are shown in Table 10. Sodium ion and potassium ion were captured and fixed in the hardened plate and elution of these ions was remarkably prevented as compared with in the blank test of Comparative Example 9.

TABLE 10

|  | Hydrous oxide | Eluted ions | | |
|---|---|---|---|---|
|  |  | $Na^+$ | $K^+$ | $Cl^-$ |
| Example 13 | Bismuth antimonate (3:1) | 5 ppm | <1 ppm | 3.5 ppm |
| Example 14 | Manganese antimonate (3:2) | <1 ppm | <1 ppm | 70 ppm |
| Comparative Example 9 | — (Blank) | 70 ppm | 5.0 ppm | 110 ppm |

EXAMPLE 15 AND COMPARATIVE EXAMPLE 10

10 g of bismuth nitrate pentahydrate and 8 g of mannitol were mixed for 15 minutes. The mixture was dissolved in 50 g of water. The solution was poured into 50 g of 20% aqueous sodium hydroxide solution and the total amount was made 550 ml with water. Thereafter, pH was made 10 by addition of 4N sulfuric acid. The resultant precipitate was left to stand to room temperature for 24 hours, digested, filtered out and then washed with water until no sodium ion was detected.

Thereafter, the product was calcined at 350° C. for 1 hour to obtain hydrous bismuth oxide. 0.3 g of thus obtained hydrous bismuth oxide, 0.3 g of manganese antimonate obtained in Example 14, 4 g of polyphenylene sulfide and 4 g of fused silica were mixed by a powder mixer. The mixture was molded in the same manner as in Example 12.

The molded product was subjected to the same hot water elution test as in Example 12 to analyze sodium ion and chlorine ion (Example 15).

Similarly, a blank test was effected in the absence of the hydrous bismuth oxide and the manganese antimonate (Comparative Example 10).

The results are shown in Table 11.

TABLE 11

|  | Hydrous oxide | Eluted ion | |
|---|---|---|---|
|  |  | Na | Cl |
| Example 15 | Hydrous bismuth oxide + manganese antimonate | 2.1 ppm | 2.6 ppm |

TABLE 11-continued

| Hydrous oxide | Eluted ion | |
|---|---|---|
| | Na | Cl |
| Comparative Example 10 — (Blank) | 135 ppm | 171 ppm |

What is claimed is:

1. An insulating protective material containing a hydrous oxide of a metal together with a fusion bonding component and a filler, said hydrous oxide having ion exchange properties.

2. An insulating protective material according to claim 1 wherein the hydrous oxide has cation exchange properties or anion exchange properties.

3. An insulating protective material according to claim 1 wherein the hydrous oxide has cation exchange properties and anion exchange properties.

4. An insulating protective material according to claim 1 wherein the hydrous oxide is a mixture of a hydrous oxide having cation exchange properties and a hydrous oxide having anion exchange properties.

5. An insulating protective material according to claim 2 wherein the hydrous oxide having cation exchange properties in a polyvalent metal oxide selected from antimonic acid, tantalic acid and niobic acid or a salt thereof.

6. An insulating protective material according to claim 2 wherein the hydrous oxide having anion exchange properties is one selected from hydrotalcite, hydrous iron oxide, hydrous zirconium oxide, hydrous titanium oxide, hydrous tin oxide, hydrous manganese oxide and hydrous bismuth oxide.

7. An insulating protective material according to claim 3 wherein the hydrous oxide having cation exchange properties and anion exchange properties is one selected from manganese antimonate, bismuth antimonate, tin antimonate, titanium antimonate and zirconium antimonate.

8. An insulating protective material according to claim 1 wherein the amount of the hydrous oxide is up to 40% by weight of the total weight of the protective material.

9. An insulating protective material according to claim 8 wherein amount of the hydrous oxide is 1.5 to 25% by weight of total weight of the protective material.

10. An insulating protective material according to claim 1 wherein the fusion bonding component is low-melting glass, epoxy resin, phenolic resin or silicone resin, and the filler is fused silica, $\beta$-eucryptite, glass fiber or glass beads.

11. An insulating protective material according to claim 1 wherein the fusion bonding component is a sulfur-containing organic high molecular weight compound.

12. An insulating protective material according to claim 11 wherein the sulfur-containing organic high molecular weight compound is one selected from polyether sulfone, polyphenylene sulfide and polysulfone sulfide.

13. An insulating protective material according to claim 11 wherein a sulfur containing organic compound containing a halogen atom and selected from 1,4-dichlorobenzene and dichlorodiphenyl sulfone is used to prepare the sulfur containing organic high molecular weight compound.

* * * * *